United States Patent
Patel et al.

(10) Patent No.: US 11,281,535 B2
(45) Date of Patent: Mar. 22, 2022

(54) METHOD AND SYSTEM FOR PERFORMING A CHECKPOINT ZONE OPERATION FOR A SPARE PERSISTENT STORAGE

(71) Applicant: Dell Products L.P., Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/810,941

(22) Filed: Mar. 6, 2020

(65) Prior Publication Data

US 2021/0279153 A1    Sep. 9, 2021

(51) Int. Cl.
*G06F 11/00* (2006.01)
*G06F 11/10* (2006.01)
*G06F 11/20* (2006.01)
*G06F 11/14* (2006.01)
*G06F 11/16* (2006.01)

(52) U.S. Cl.
CPC ...... *G06F 11/1088* (2013.01); *G06F 11/1004* (2013.01); *G06F 11/1469* (2013.01); *G06F 11/1658* (2013.01); *G06F 11/1662* (2013.01); *G06F 11/2094* (2013.01); *G06F 2201/82* (2013.01)

(58) Field of Classification Search
CPC ............ G06F 11/1004; G06F 11/1088; G06F 11/1469; G06F 11/1658; G06F 11/1662; G06F 11/2094
See application file for complete search history.

(56) References Cited

U.S. PATENT DOCUMENTS

| | | | |
|---|---|---|---|
| 4,780,809 A | 10/1988 | Woffinden et al. | |
| 5,689,678 A * | 11/1997 | Stallmo | G06F 3/0608 |
| | | | 711/112 |
| 6,098,098 A | 8/2000 | Sandahl et al. | |
| 6,516,425 B1 | 2/2003 | Belhadj et al. | |
| 7,636,814 B1 | 12/2009 | Karr et al. | |

(Continued)

FOREIGN PATENT DOCUMENTS

WO    2015114643 A1    8/2015

OTHER PUBLICATIONS

"Features—RoboHead"; Project Management Software for Marketing & Creative Teams, Aquent; 2018 (https://www.robohead.net/features) 1 page).

(Continued)

*Primary Examiner* — Joshua P Lottich
(74) *Attorney, Agent, or Firm* — Chamberlain, Hrdlicka, White, Williams & Aughtry

(57) ABSTRACT

In general, the invention relates to a method for managing data. The method includes detecting a persistent storage device failure in a persistent storage device of a plurality of persistent storage devices, and in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device.

17 Claims, 12 Drawing Sheets

(56) References Cited

U.S. PATENT DOCUMENTS

| | | | |
|---|---|---|---|
| 7,882,386 B1* | 2/2011 | Potnis | G06F 11/1435 714/2 |
| 7,987,353 B2 | 7/2011 | Holdaway et al. | |
| 8,037,345 B1 | 10/2011 | Iyer et al. | |
| 8,099,571 B1 | 1/2012 | Driscoll et al. | |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |
| 8,583,769 B1 | 11/2013 | Peters et al. | |
| 8,788,466 B2 | 7/2014 | Anglin et al. | |
| 8,868,987 B2 | 10/2014 | Wagner | |
| 8,874,892 B1 | 10/2014 | Chan et al. | |
| 8,898,114 B1 | 11/2014 | Feathergill et al. | |
| 8,949,208 B1 | 2/2015 | Xu et al. | |
| 9,122,501 B1 | 9/2015 | Hsu et al. | |
| 9,201,751 B1 | 12/2015 | Muthirisavenugopal et al. | |
| 9,256,378 B2 | 2/2016 | Zheng et al. | |
| 9,256,381 B1* | 2/2016 | Fultz | G06F 3/0617 |
| 9,278,481 B2 | 3/2016 | Hull | |
| 9,355,036 B2 | 5/2016 | Beard et al. | |
| 9,521,198 B1 | 12/2016 | Agarwala et al. | |
| 9,696,939 B1 | 7/2017 | Frank et al. | |
| 9,710,367 B1 | 7/2017 | Nagineni | |
| 9,749,480 B1 | 8/2017 | Katano | |
| 9,792,316 B1 | 10/2017 | Cremelie | |
| 9,830,111 B1 | 11/2017 | Patiejunas et al. | |
| 9,898,224 B1 | 2/2018 | Marshak et al. | |
| 10,002,048 B2 | 6/2018 | Chennamsetty et al. | |
| 10,013,323 B1 | 7/2018 | Puhov et al. | |
| 10,013,325 B1 | 7/2018 | Garrett, Jr. et al. | |
| 10,031,672 B2 | 7/2018 | Wang et al. | |
| 10,057,184 B1 | 8/2018 | Prahlad et al. | |
| 10,091,295 B1 | 10/2018 | Savic et al. | |
| 10,097,620 B2 | 10/2018 | Reddy et al. | |
| 10,152,254 B1 | 12/2018 | Kang et al. | |
| 10,185,624 B2 | 1/2019 | Akutsu et al. | |
| 10,241,695 B2 | 3/2019 | Baptist et al. | |
| 10,339,455 B1 | 7/2019 | Parush-Tzur et al. | |
| 10,409,778 B1 | 9/2019 | Zhao et al. | |
| 10,452,301 B1 | 10/2019 | Farhan | |
| 10,503,413 B1 | 12/2019 | Gal et al. | |
| 10,503,611 B1 | 12/2019 | Srivastav et al. | |
| 10,528,429 B1* | 1/2020 | Vempati | G06F 11/1435 |
| 10,817,392 B1 | 10/2020 | Mcauliffe et al. | |
| 10,929,256 B2 | 2/2021 | Danilov et al. | |
| 10,956,601 B2 | 3/2021 | Surla et al. | |
| 10,990,480 B1 | 4/2021 | Bernat et al. | |
| 11,005,468 B1 | 5/2021 | Subramanian et al. | |
| 2001/0044879 A1 | 11/2001 | Moulton et al. | |
| 2003/0036882 A1 | 2/2003 | Harper et al. | |
| 2003/0058277 A1 | 3/2003 | Bowman-Amuah | |
| 2003/0065873 A1 | 4/2003 | Collins et al. | |
| 2003/0172145 A1 | 9/2003 | Nguyen | |
| 2003/0177205 A1 | 9/2003 | Liang et al. | |
| 2004/0128587 A1 | 7/2004 | Kenchammana-Hosekote et al. | |
| 2005/0076049 A1 | 4/2005 | Qubti et al. | |
| 2005/0086557 A1 | 4/2005 | Sato et al. | |
| 2005/0182797 A1* | 8/2005 | Adkins | G06F 16/10 |
| 2005/0262385 A1 | 11/2005 | Mcneill, Jr. et al. | |
| 2007/0214255 A1 | 9/2007 | Spitz et al. | |
| 2007/0283011 A1 | 12/2007 | Rakowski et al. | |
| 2008/0244204 A1 | 10/2008 | Cremelie et al. | |
| 2009/0077165 A1 | 3/2009 | Rhodes et al. | |
| 2009/0094250 A1 | 4/2009 | Dhuse et al. | |
| 2009/0235022 A1 | 9/2009 | Bates et al. | |
| 2009/0265360 A1 | 10/2009 | Bachwani et al. | |
| 2010/0138604 A1* | 6/2010 | Noguchi | G06F 11/2069 711/114 |
| 2011/0099351 A1 | 4/2011 | Condict | |
| 2011/0197024 A1* | 8/2011 | Thomas | G06F 3/0631 711/114 |
| 2011/0246597 A1 | 10/2011 | Swanson et al. | |
| 2012/0096309 A1 | 4/2012 | Kumar et al. | |
| 2013/0047029 A1* | 2/2013 | Ikeuchi | G06F 11/1662 714/6.22 |
| 2013/0067459 A1 | 3/2013 | Sannidhanam et al. | |
| 2013/0086006 A1 | 4/2013 | Colgrove | |
| 2013/0151683 A1 | 6/2013 | Jain et al. | |
| 2013/0339818 A1 | 12/2013 | Baker et al. | |
| 2013/0339819 A1 | 12/2013 | Georgakos et al. | |
| 2014/0020083 A1 | 1/2014 | Fetik | |
| 2014/0059311 A1 | 2/2014 | Oberhofer et al. | |
| 2014/0089265 A1 | 3/2014 | Talagala et al. | |
| 2014/0089630 A1 | 3/2014 | Pignatelli | |
| 2014/0297603 A1 | 10/2014 | Kim et al. | |
| 2015/0012775 A1 | 1/2015 | Cudak et al. | |
| 2015/0058582 A1 | 2/2015 | Baldwin et al. | |
| 2015/0095596 A1 | 4/2015 | Yang | |
| 2015/0161000 A1 | 6/2015 | Kim et al. | |
| 2015/0205669 A1 | 7/2015 | Sundaram et al. | |
| 2015/0220400 A1 | 8/2015 | Resch et al. | |
| 2015/0227602 A1 | 8/2015 | Ramu et al. | |
| 2015/0286545 A1 | 10/2015 | Brown | |
| 2015/0355980 A1 | 12/2015 | Volvovski et al. | |
| 2016/0013988 A1 | 1/2016 | Andrews | |
| 2016/0062674 A1 | 3/2016 | Benight et al. | |
| 2016/0070652 A1* | 3/2016 | Sundararaman | G06F 3/065 711/154 |
| 2016/0077933 A1 | 3/2016 | Ventura et al. | |
| 2016/0085630 A1 | 3/2016 | Gardner | |
| 2016/0246537 A1 | 8/2016 | Kim | |
| 2017/0090767 A1 | 3/2017 | Poston et al. | |
| 2017/0099187 A1 | 4/2017 | Dale et al. | |
| 2017/0147437 A1 | 5/2017 | Borlick et al. | |
| 2017/0160983 A1 | 6/2017 | Fiske et al. | |
| 2017/0192865 A1 | 7/2017 | Pan | |
| 2017/0192868 A1 | 7/2017 | Vijayan et al. | |
| 2017/0206034 A1 | 7/2017 | Fetik | |
| 2017/0235609 A1 | 8/2017 | Wires et al. | |
| 2017/0308436 A1 | 10/2017 | Agombar et al. | |
| 2018/0018227 A1* | 1/2018 | Kazi | G06F 3/0659 |
| 2018/0018235 A1 | 1/2018 | Arslan et al. | |
| 2018/0060894 A1 | 3/2018 | Beveridge et al. | |
| 2018/0157532 A1 | 6/2018 | Kumar et al. | |
| 2018/0165169 A1 | 6/2018 | Camp et al. | |
| 2018/0189109 A1 | 7/2018 | Nagai et al. | |
| 2018/0217898 A1 | 8/2018 | Tormasov | |
| 2018/0260123 A1* | 9/2018 | Andresen | G06F 3/0605 |
| 2018/0278597 A1 | 9/2018 | Helms et al. | |
| 2018/0284987 A1 | 10/2018 | Lazier | |
| 2018/0307560 A1 | 10/2018 | Vishnumolakala et al. | |
| 2018/0314607 A1* | 11/2018 | Deshpande | G06F 16/28 |
| 2018/0322558 A1 | 11/2018 | Padmanabh et al. | |
| 2018/0356998 A1* | 12/2018 | Wu | G06F 12/0246 |
| 2019/0050263 A1 | 2/2019 | Patel et al. | |
| 2019/0104398 A1 | 4/2019 | Owen et al. | |
| 2019/0108099 A1* | 4/2019 | Mazumdar | G06F 16/188 |
| 2019/0109772 A1 | 4/2019 | Lipstone et al. | |
| 2019/0197023 A1 | 6/2019 | Chennamsetty et al. | |
| 2019/0332473 A1 | 10/2019 | Yang et al. | |
| 2019/0332502 A1 | 10/2019 | Ma et al. | |
| 2019/0361850 A1 | 11/2019 | Uno et al. | |
| 2019/0379588 A1 | 12/2019 | Rao | |
| 2020/0026439 A1 | 1/2020 | Gao et al. | |
| 2020/0034257 A1 | 1/2020 | Mahmood et al. | |
| 2020/0042388 A1 | 2/2020 | Roberts | |
| 2020/0050689 A1 | 2/2020 | Tal et al. | |
| 2020/0065101 A1* | 2/2020 | Zhou | G06F 11/1088 |
| 2020/0133503 A1* | 4/2020 | Sun | G06F 3/0604 |
| 2020/0175038 A1 | 6/2020 | Guan et al. | |
| 2020/0201837 A1 | 6/2020 | Motwani et al. | |
| 2020/0257457 A1 | 8/2020 | Matsugami et al. | |

OTHER PUBLICATIONS

"Make more time for the work that matters most"; Asana, Inc.; 2017 (https://asana.com/) (7 pages).

"Online Project Management Tools & Features"; ProWorkflow; Jun. 2015 (https://www.proworkflow.com/features-project-management-tools/) (7 pages).

(56) References Cited

OTHER PUBLICATIONS

Extended European Search Report issued in corresponding European Application No. 20152194.5, dated Jun. 29, 2020 (10 pages).
Extended European Search Report issued in corresponding European Application No. 20152195.2, dated Jun. 2, 2020 (6 pages).
Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

* cited by examiner

METHOD AND SYSTEM FOR PERFORMING A CHECKPOINT ZONE OPERATION FOR A SPARE PERSISTENT STORAGE

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing data. The method includes detecting a persistent storage device failure in a persistent storage device of a plurality of persistent storage devices, and in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device.

In general, in one aspect, the invention relates to a system that includes a processor and data processor, which when executed by the processor performs a method. The method comprises detecting a persistent storage device failure in a persistent storage device of a plurality of persistent storage devices, and in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device.

In general, in one aspect, the invention relates to a non-transitory computer readable medium which includes computer readable program code, which when executed by a computer processor enables the computer processor to perform a method. The method includes detecting a persistent storage device failure in a persistent storage device of a plurality of persistent storage devices, and in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. More specifically, embodiments of the invention relate to proactively protecting data stored in the data cluster using checkpoint zones (see e.g., FIG. 3A). Further, in various embodiments of the invention, one or more persistent storage devices may include a health monitor. In these scenarios, the health monitor includes functionality to detect when persistent storage (or a portion thereof) in the persistent storage device may fail. In this scenario, the data processor may initiate the method shown in FIG. 3B to proactively copy data from the potentially failing persistent storage device to a spare persistent storage device.

Figure 1A:
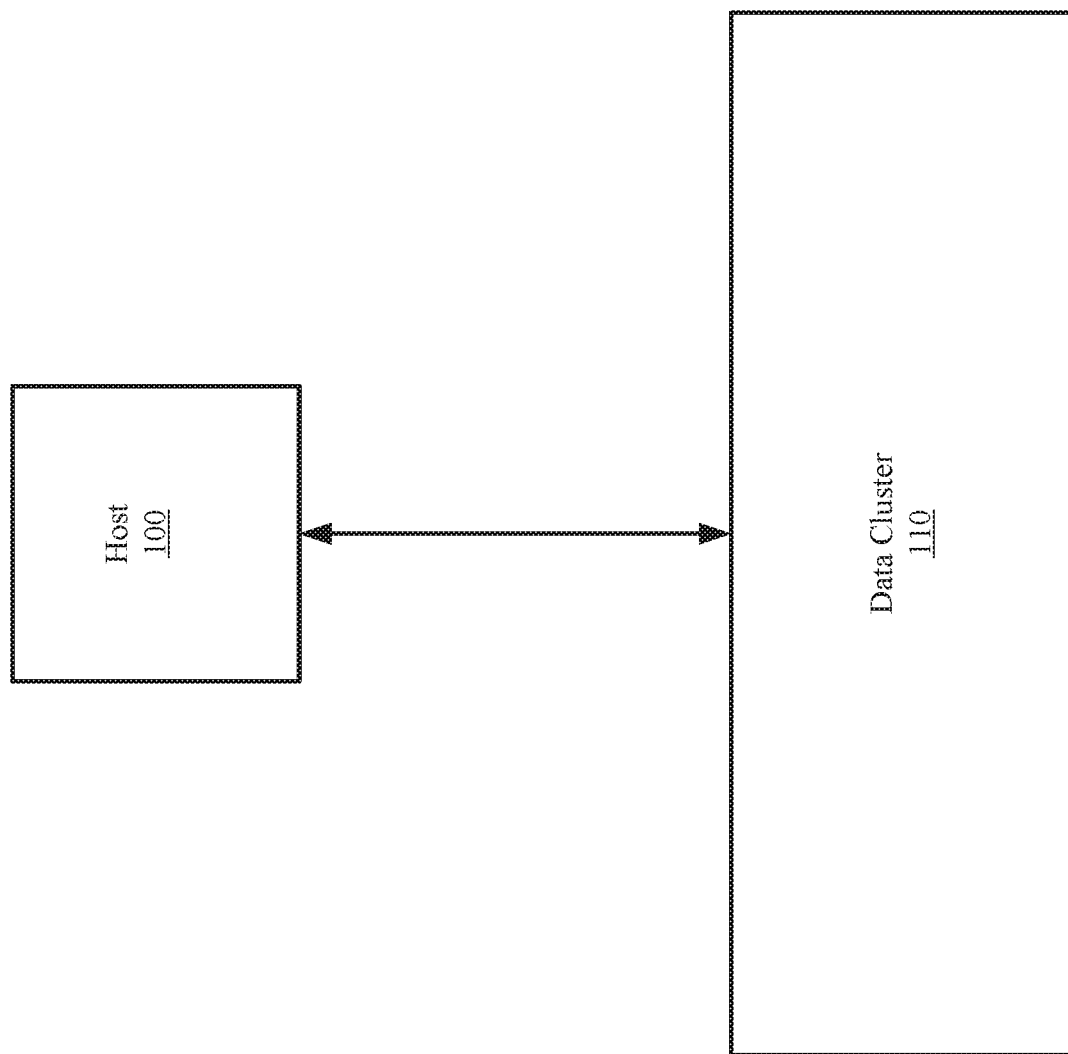
FIG. 1A shows a diagram of a system in accordance with one or more embodiments of the invention.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
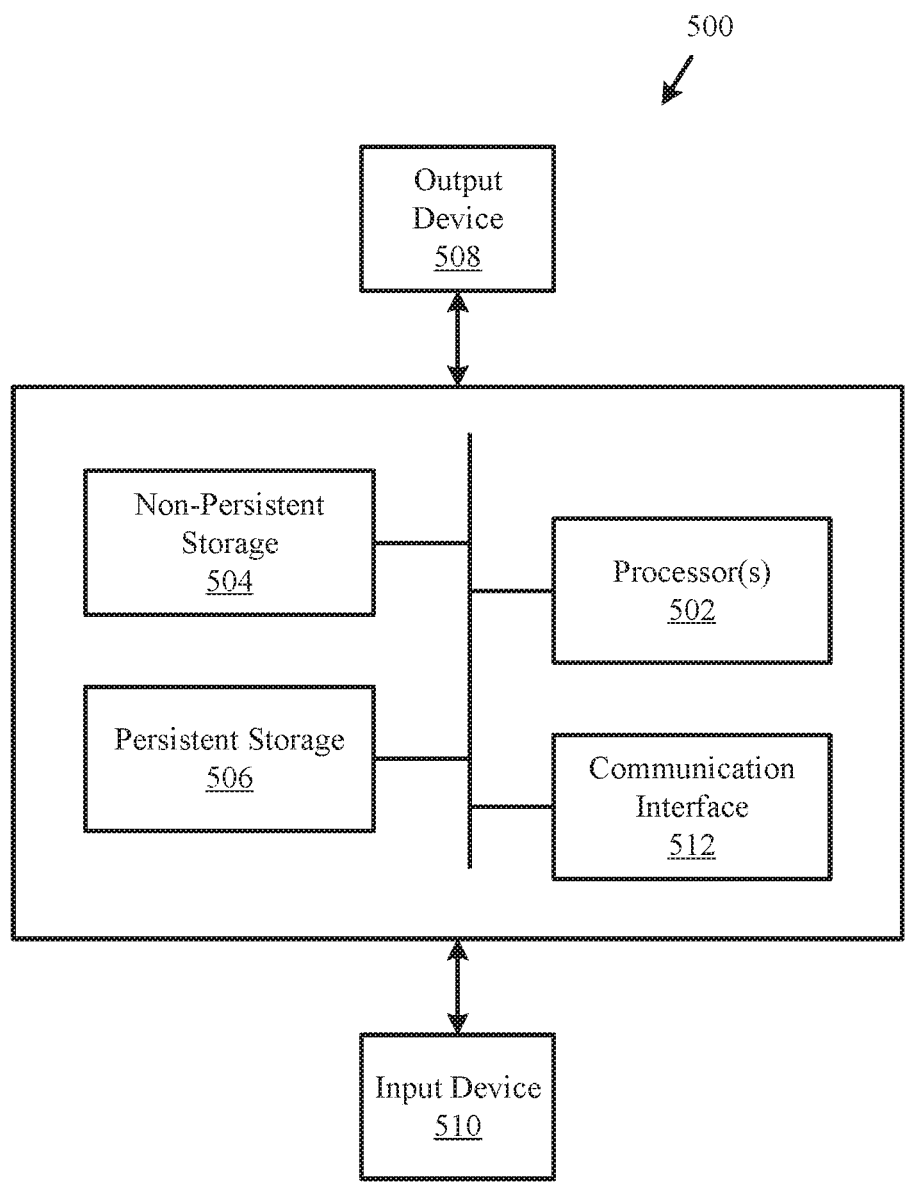
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across persistent storage devices operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

In one or more embodiments of the invention, an erasure coding procedure includes dividing the obtained data into portions, referred to as data chunks. Each data chunk may include any number of data segments associated with the obtained data. The individual data chunks may then be combined (or otherwise grouped) into data slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. The chunks of a data slice may then be stored across different persistent storage devices in a data cluster. Any chunk within a data slice may be reconstructed using the other chunks in the data slice. Non-limiting examples of erasure coding algorithms are RAID-3, RAID-4, RAID-5, and RAID-6. Other erasing coding algorithms may be used without departing from the invention.

Continuing with the discussion of FIG. 1A, the data cluster (110) may include persistent storage devices that each store any number of portions of data. The portions of data may be obtained by other persistent storage devices or obtained from the host (100). For additional details regarding the data cluster (110), see, e.g., FIG. 1B.

Figure 1B:
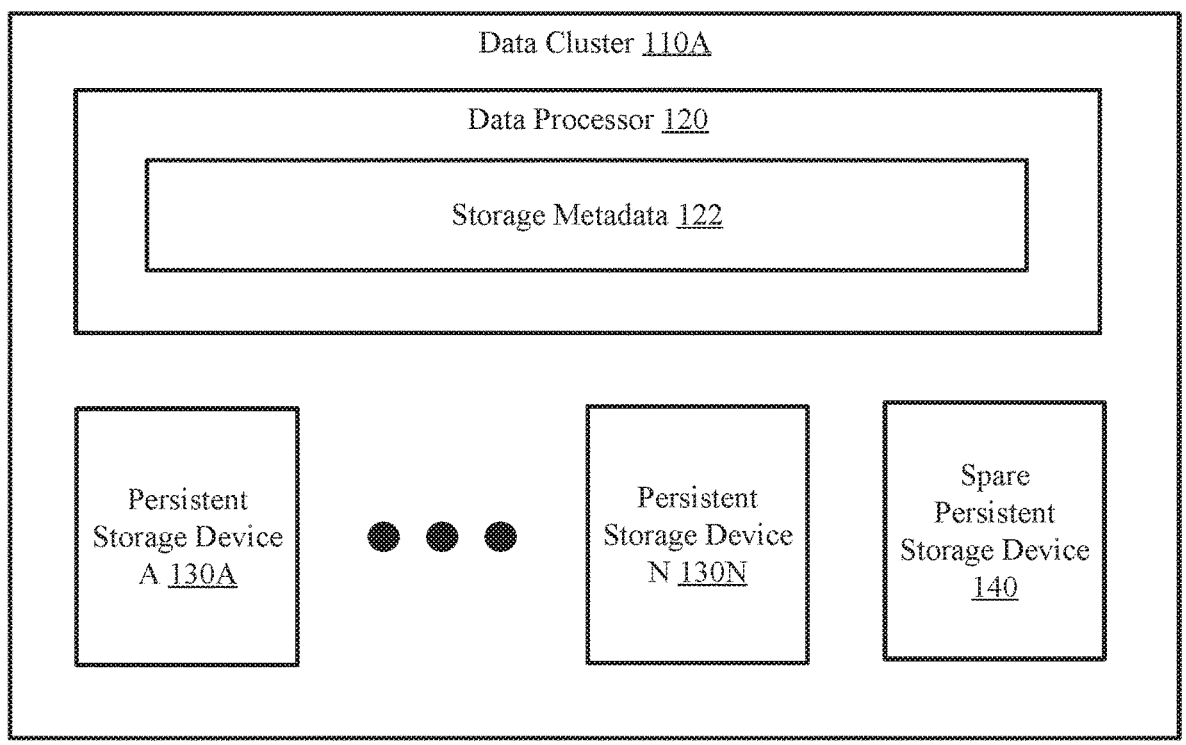
FIG. 1B shows a diagram of a data cluster in accordance with one or more embodiments of the invention.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include a data processor (120), any number of persistent storage devices (130A, 130N), and a spare persistent storage device (140). The components of the data cluster (110A) may be operably connected via any combination of wired and/or wireless connections. Each of the aforementioned components is discussed below.

In one or more embodiments of the invention, the data processor (120) is a device (physical or logical) that includes the functionality to perform erasure encoding on data obtained from a host (e.g., 100, FIG. 1A) and manage the storage of the resulting data chunks in to the persistent storage devices of the data cluster. Additionally, in one or more embodiments of the invention, the data processor (120) orchestrates the rebuilding of a failed or potentially failing persistent storage device (e.g., 130A, 130N) using a spare persistent storage (140). The data processor (120) may perform the storage management and persistent storage device rebuilding via the methods illustrated in FIGS. 3A-3C. The data processor (120) may generate, utilize, and update storage metadata (122) as part of its erasure encoding, storage management, and persistent storage device rebuilding functionality. For additional details regarding the storage metadata (122), refer to FIG. 2.

Figure 3A:
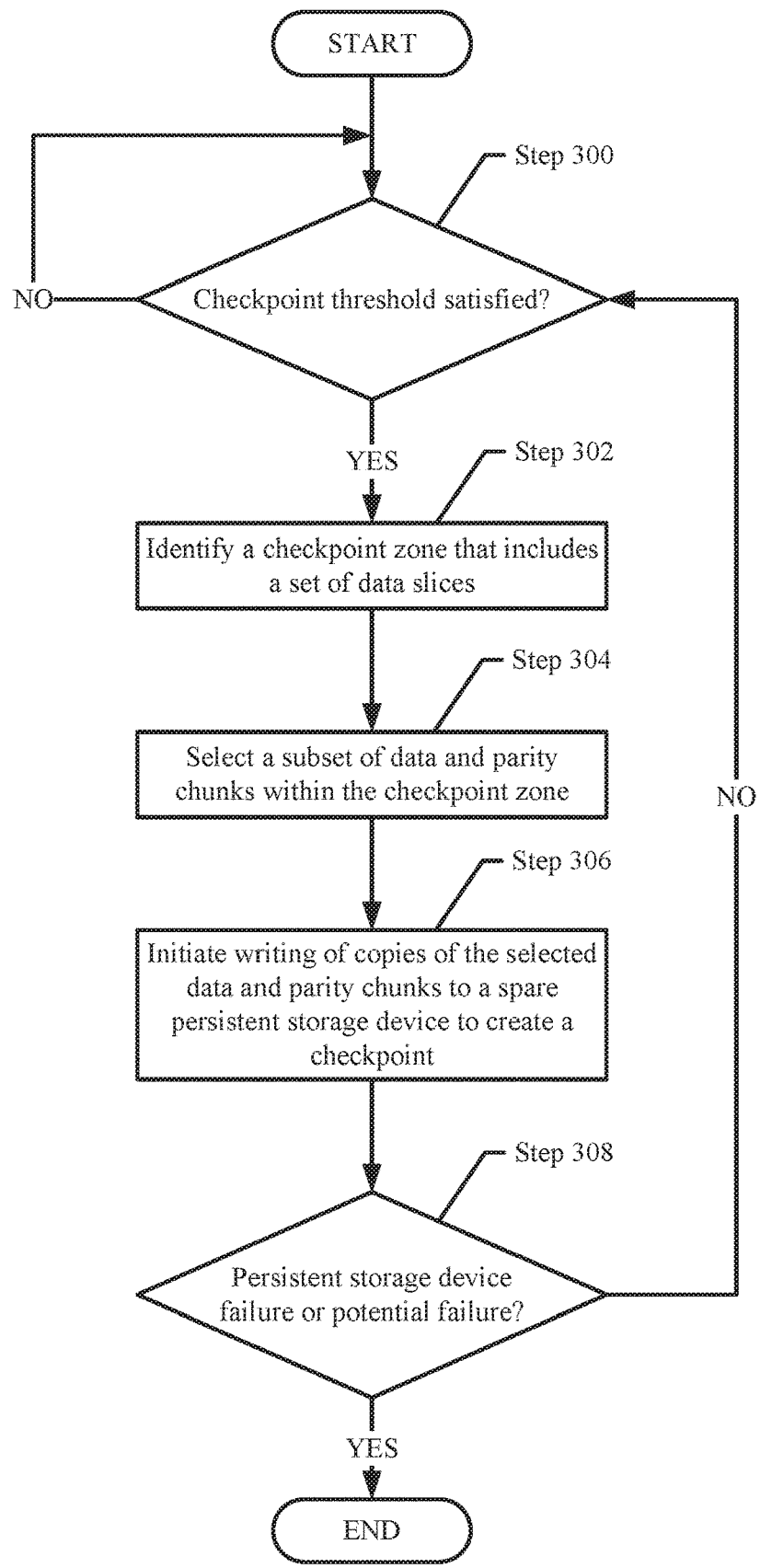
FIG. 3A shows a flowchart for performing a checkpoint zone operation in accordance with one or more embodiments of the invention.
Figure 3B:
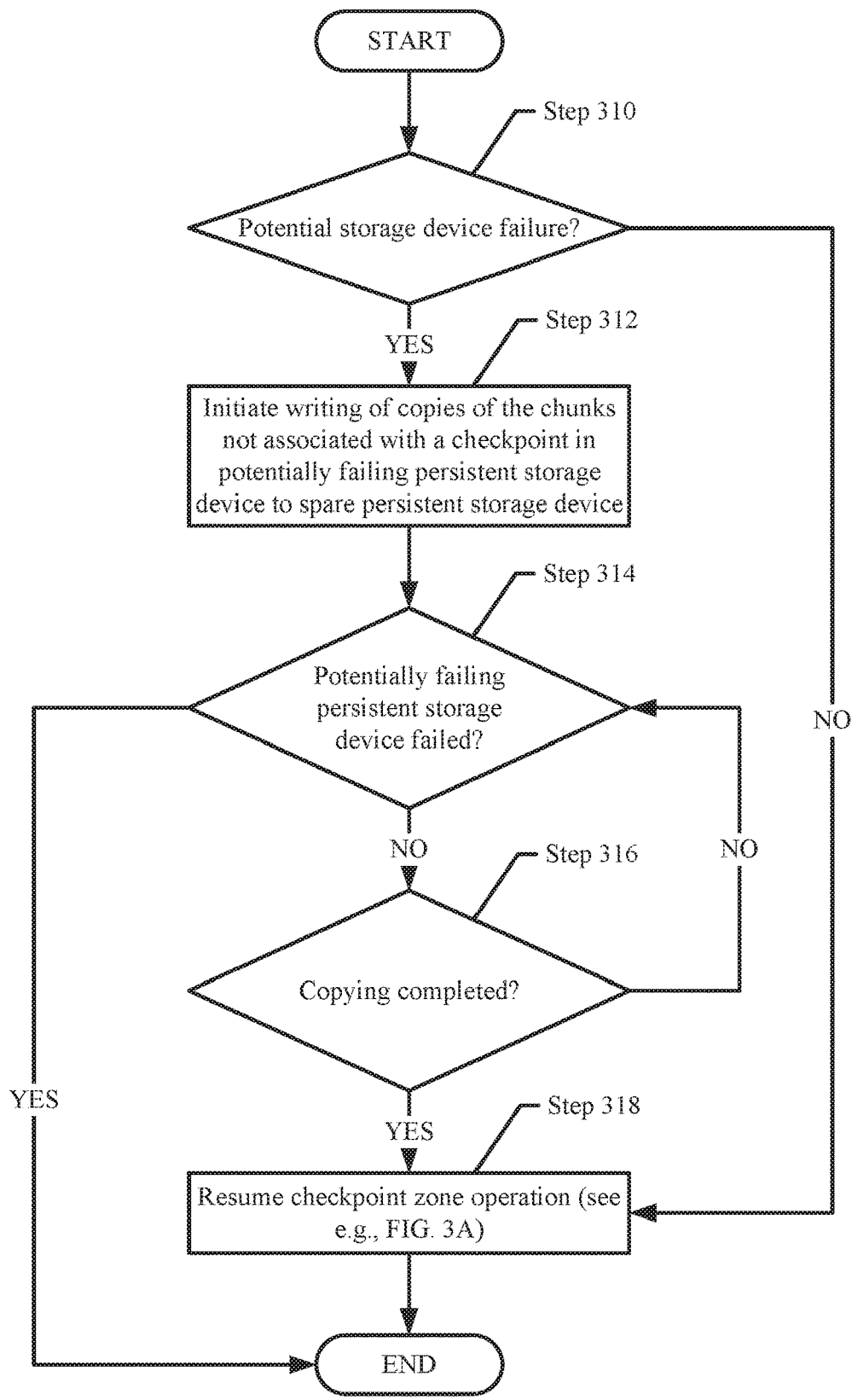
FIG. 3B shows a flowchart for performing a proactive copy operation in accordance with one or more embodiments of the invention.
Figure 3C:
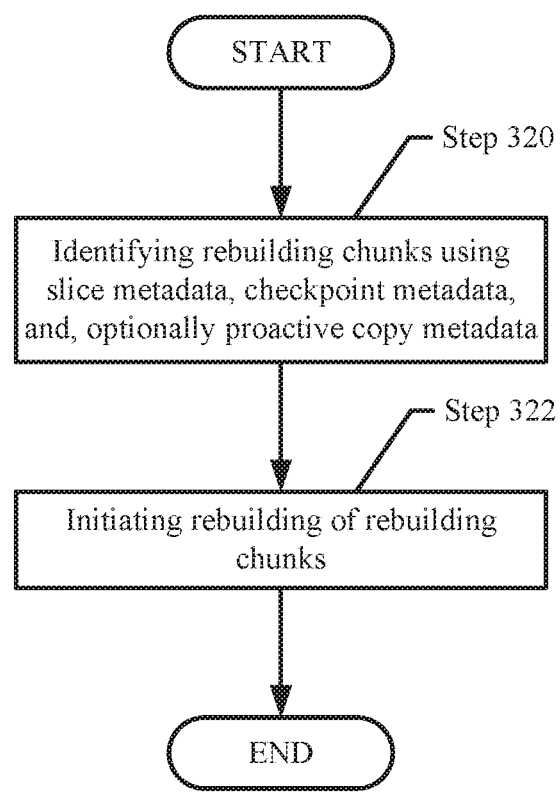
FIG. 3C shows a flowchart for performing a rebuild of a failed persistent storage device in accordance with one or more embodiments of the invention.

In one or more of embodiments of the invention, the data processor (120) is implemented as computer instructions, e.g., computer code, stored on a persistent storage that when executed by a processor of a persistent storage device (e.g., 130A, 130N) cause the persistent storage device to provide the aforementioned functionality of the data processor (120) described throughout this application and/or all, or a portion thereof, of the methods illustrated in FIGS. 3A-3C.

In one or more embodiments of the invention, the data processor (120) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (120) described throughout this application and/or all, or a portion thereof, of the methods illustrated in FIGS. 3A-3C.

In one or more embodiments of the invention, the data processor (120) is implemented as a logical device. The logical device may utilize the computing resources of any number of computing devices and thereby provide the functionality of the data processor (120) described throughout this application and/or all, or a portion thereof, of the methods illustrated in FIGS. 3A-3C.

In one or more embodiments of the invention, the persistent storage devices (130A, 130N) store data and rebuild data. The data may be data chunks and/or parity chunks. The persistent storage devices (130A, 130N) may include non-volatile storage (also referred to as persistent storage). In other words, the data stored in the persistent storage devices (130A, 130N) is not lost or removed when the persistent storage devices (130A, 130N) lose power. For additional details regarding the persistent storage devices, see, e.g., FIG. 1C.

In one or more embodiments of the invention, the persistent storage devices (130A, 130N) are implemented as computing devices (see e.g., FIG. 5). The computing devices may be, for example, a laptop computer, a desktop computer, a server, a distributed computing system, or a cloud resource (e.g., a third-party storage system accessible via a wired or wireless connection). The computing devices may include one or more processors (e.g., 152), memory (e.g., random access memory), and persistent storage (e.g., disk drives, solid state drives, etc.). The computing devices may include instructions, stored on the persistent storage, that when executed by the processor(s) of the computing devices cause the computing devices to perform the functionality of the persistent storage devices (130A, 130N) described throughout this application. For additional details regarding the persistent storage devices, see, e.g., FIG. 1C.

In one or more embodiments of the invention, the persistent storage devices (130A, 130N) are implemented as logical devices. The logical devices may utilize the computing resources of any number of computing devices and thereby provide the functionality of the persistent storage devices (130A, 130N) described throughout this application.

In one or more embodiments of the invention, the spare persistent storage device (140) stores data like the persistent storage devices (130A, 130N). The data may be data chunks and/or parity chunks. However, unlike the persistent storage devices (130A, 130N), the spare persistent storage device (140) is a passive persistent storage device. In other words, the spare persistent storage device (140) does not participate in the direct storage of data from the host (e.g., 100, FIG. 1A) like the persistent storage devices (130A, 130N). Instead, the data processor (120) may use the spare persistent storage device (140) to store data chunks and parity chunks, as well as use the aforementioned stored chunks to rebuild the corresponding chunks on failed persistent storage devices (e.g., 130A, 130N). For additional details regarding the persistent storage devices, see, e.g., FIG. 1C.

In one or more embodiments of the invention, the spare persistent storage device (140) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the spare persistent storage device (140) described throughout this application.

In one or more embodiments of the invention, the spare persistent storage device (140) is implemented as a logical device. The logical device may utilize the computing resources of any number of computing devices and thereby provide the functionality of the spare persistent storage device (140) described throughout this application.

The spare persistent storage device (140) may include more storage capacity than the persistent storage devices (130A, 130N) in order to store larger quantities of data (e.g., data chunks and parity chunks) as a result of checkpoint zone operations, proactive copy operations, and persistent storage device rebuild operations. For additional information regarding checkpoint zone operations, proactive copy operations, and persistent storage device rebuild operations, refer to FIGS. 3A-3C respectively.

Figure 1C:
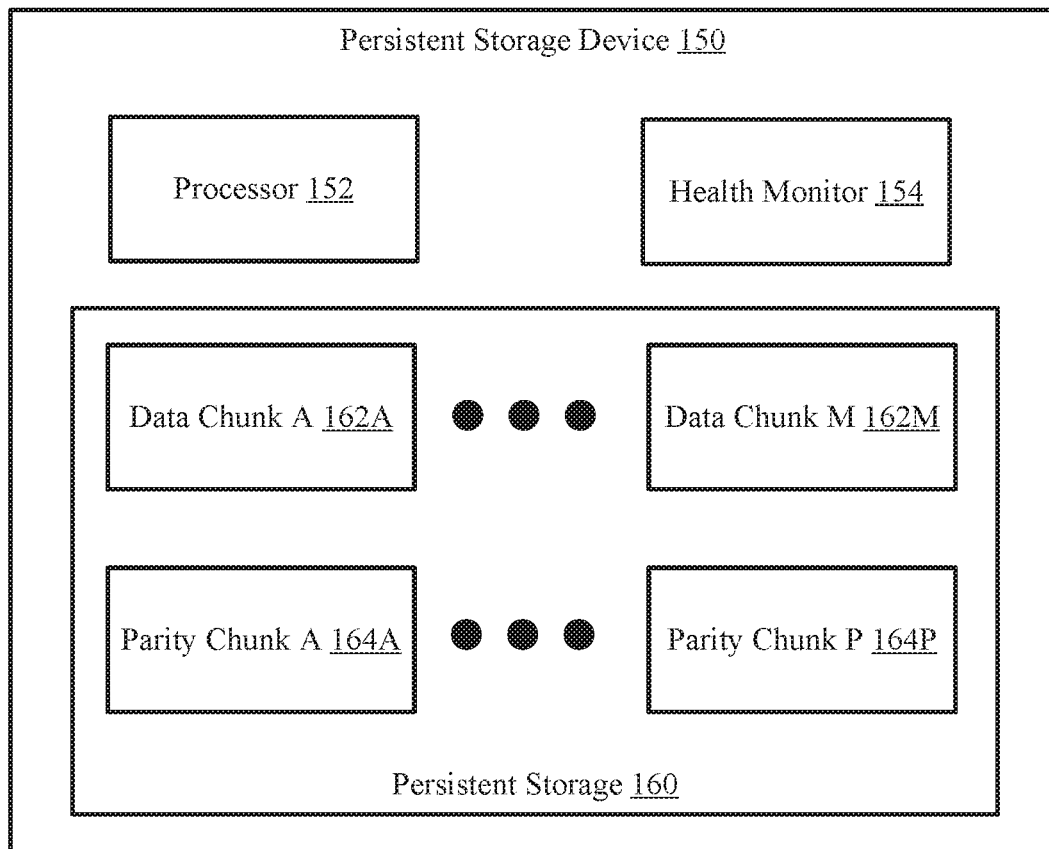
FIG. 1C shows a diagram of persistent storage device in accordance with one or more embodiments of the invention.

FIG. 1C shows a diagram of a persistent storage device in accordance with one or more embodiments of the invention. The persistent storage device (150) may be an embodiment of a persistent storage device (130A, 130N) discussed above. As discussed above, the persistent storage device (150) stores and rebuilds data. The data may be data chunks (162A, 162M) and parity chunks (164A, 164P). The persistent storage device (150) may include a processor (152), health monitor (154), and persistent storage (160). Each of these components is discussed below.

In one or more embodiments of the invention, the processor (152) is a component that processes data and processes requests. The processor (142) may be, for example, a central processing unit (CPU). The processor (152) may be other types of processors without departing from the invention. The processor (152) may process a request to store data and rebuild data using data stored in persistent storage (160) or from other persistent storage devices (e.g., 130A, 130N, FIG. 1B). The processor (152) may process other requests without departing from the invention.

In one or more embodiments of the invention, the health monitor (154) is a component that monitors the health of persistent storage (160) of the persistent storage device (150). The health monitor (154) may be, for example, computer instructions that when executed by a processor (e.g., 152) of the persistent storage device (150), enables the persistent storage device (150) to perform the functionality of the health monitor (154).

In one or more embodiments of the invention, the health monitor (154) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the health monitor (154) described throughout this application. The health monitor may be implemented using another type of physical device without departing from the invention.

The health monitor (154) may detect and report various indicators of persistent storage (160) reliability with the intent of anticipating persistent storage (160) failures. The indicators of persistent storage (160) reliability may include attributes that have threshold values that should not be passed under normal operating conditions of the persistent storage device (150). The health monitor (154) may monitor these attributes and send a notification to the data processor (120, FIG. 1B) when these attributes indicate a potential persistent storage device (150) failure. These attributes may include, for example, reallocated sectors, temperature, and flash endurance parameters. The attributes may include other and/or additional parameters without departing from the invention.

As discussed above, the persistent storage (160) may store data. The data stored in persistent storage 160) may include data chunks (162A, 162M) and parity chunks (164A, 164P).

Each of these data structures is discussed below. The persistent storage (160) may store other and/or additional data without departing from the invention.

The persistent storage (160) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (160) may utilize portions of any combination of hard disk drives, solid state disk drives, tape drives, and/or any other physical storage medium of any number of computing devices.

In one or more embodiments of the invention, a data chunk (162A, 162M) is a data structure that includes a portion of data that was obtained from a host. The data chunks (162A, 162M) may be (but are not required to be) deduplicated by a data processor and obtained by the persistent storage device (150) from the data processor. Each of the data chunks (162A, 162M) may be used by the persistent storage device (150) (or another persistent storage device) to reconstruct another data chunk or a parity chunk based on an erasure coding algorithm that was applied to the other data chunk or parity chunk.

In one or more embodiments of the invention, a parity chunk (164A, 164P) is a data structure that includes a parity value generated using an erasure coding algorithm. The parity value may be generated by applying the erasure coding algorithm to one or more data chunks stored in the persistent storage device (150) or other data nodes. Each of the parity chunks (164A, 164P) may be used by the persistent storage device (150) (or another persistent storage device) to reconstruct another parity chunk or a data chunk based on an erasure coding algorithm that was applied to the other parity chunk or data chunk.

Figure 2:
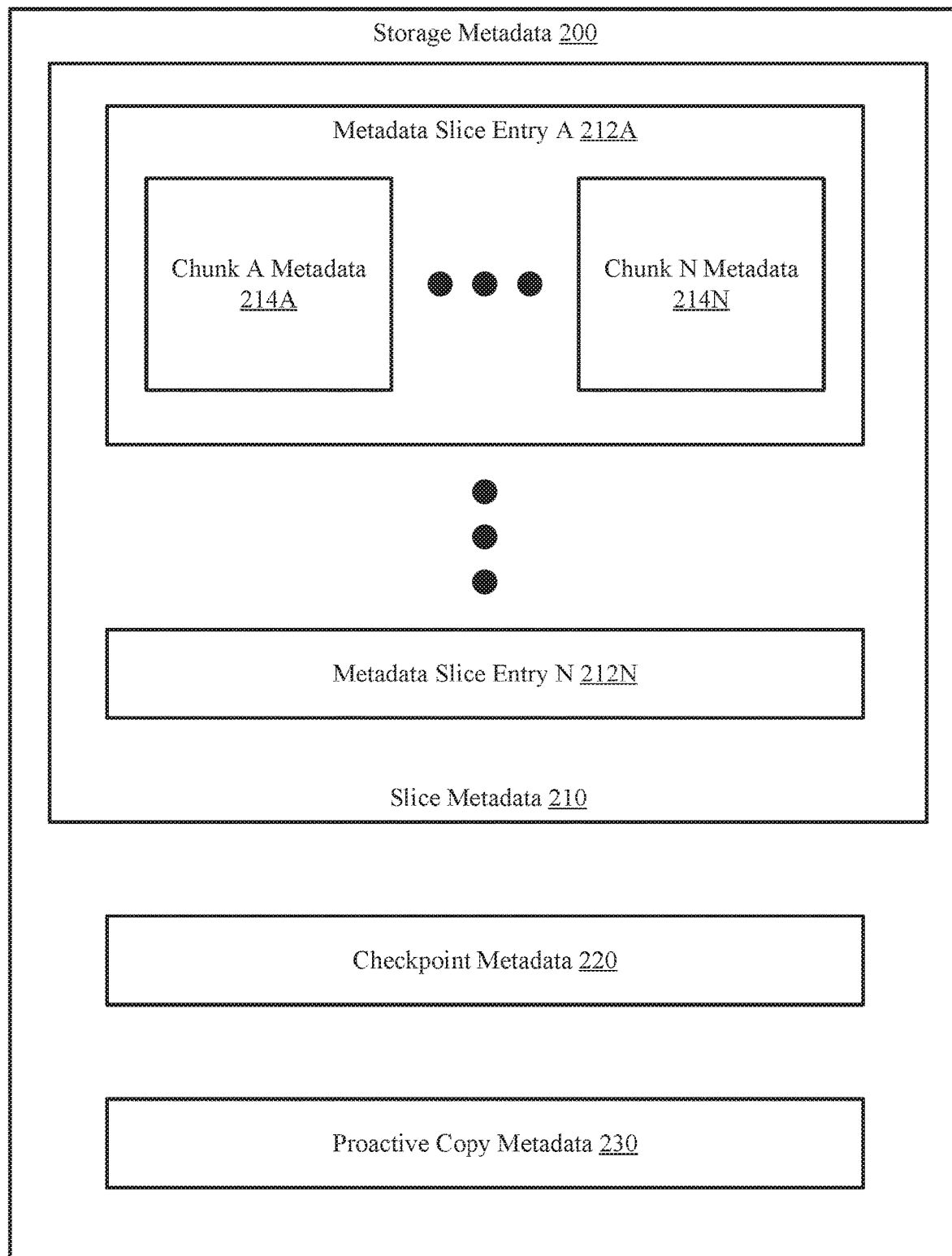
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (122, FIG. 1B) discussed above. As discussed above, the storage metadata (200) includes information about data chunks and/or parity chunks (collectively, chunks). The storage information may include slice metadata (210), checkpoint metadata (220), and proactive copy metadata (230). Each of the aforementioned portions of storage metadata (200) is discussed below.

In one or more embodiments of the invention, slice metadata (210) includes metadata associated with data slices. Each data slice may have an associated metadata slice entry (e.g., 212A, 212N) generated by the data processor (120, FIG. 1B) when the data slice was generated and stored across the persistent storage devices (e.g., 130A, 130N, FIG. 1B) of the data cluster (e.g., 110A, FIG. 1B). The metadata slice entry (212A, 212N) includes chunk metadata (214A, 214N). Each chunk of a chunk metadata (214A, 214N) may correspond to metadata for a data chunk or a parity chunk. Each chunk metadata (214A, 214N) may include information about a chunk such as, for example, a unique identifier (e.g., a fingerprint) that may be used to differentiate the chunks stored in the data cluster (110, FIG. 1A), a storage location of the chunk (e.g., the persistent storage device in which the chunk is stored), and a data slice identifier that identifies the data slice in which the chunk is associated. The chunk metadata (214A, 214N) may include other and/or additional information regarding the chunks without departing from the invention.

In one or more embodiments of the invention, checkpoint metadata (220) includes metadata associated with checkpoints created during a checkpoint zone operation. The checkpoint metadata (220) may include information regarding data and/or parity chunks within a checkpoint zone that were selected by the data processor (120, FIG. 1B) to be copied and stored in the spare persistent storage device (140, FIG. 1B) within a checkpoint. A checkpoint zone may include a multiple of data slices from which the data processor may select a subset of chunks to copy and send to a spare persistent storage device during a checkpoint zone operation (see e.g., FIG. 3A). The checkpoint metadata (220) may include chunk identifiers (e.g., a fingerprint) that may be used to differentiate the chunks stored in the data cluster (110, FIG. 1A), data slice identifiers that identify the data slice in which a chunk is associated that are associated with the chunks, and checkpoint zone identifiers that identify the checkpoint zone to which the chunks are associated. The data processor (120, FIG. 1B) may use the checkpoint metadata (220) during proactive copy operations and to rebuild failed or potentially failing persistent storage devices. For additional information regarding proactive copy operations and persistent storage device rebuilding operations, refer to FIGS. 3B and 3C respectively. The checkpoint metadata (220) may include other and/or additional information without departing from the invention.

In one or more embodiments of the invention, the proactive copy metadata (230) includes metadata associated with data and/or parity chunks that were copied and stored in the spare persistent storage device during a proactive copy operation. The data processor (120, FIG. 1B) may use the proactive copy metadata (230) during a persistent storage rebuild operation. For additional information regarding persistent storage rebuild operations, refer to FIG. 3C. The proactive copy metadata (230) may be generated during proactive copy operations. The proactive copy metadata (230) may include chunk identifiers (e.g., a fingerprint) that may be used to differentiate the chunks stored in the data cluster (110, FIG. 1A), storage locations of the chunks (e.g., the persistent storage device in which the chunk is stored), and associated data slice identifiers that identify the data slice in which a chunk is associated. The proactive copy metadata (230) may include other and/or additional information without departing from the invention.

FIG. 3A shows a flowchart for performing a checkpoint zone operation in accordance with one or more embodiments of the invention. The method shown in FIG. 3A may be performed by, for example, a data processor (120, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a determination is made as to whether a checkpoint threshold has been satisfied. In one or more embodiments of the invention, the checkpoint threshold is the minimum amount of data slices stored across the persistent storage devices required in order to generate a checkpoint zone. The data processor may check the number of data slices not already included in previously generated checkpoint zones and compare it with the checkpoint threshold. If the checkpoint threshold is satisfied, the method proceeds to step 302. If the checkpoint threshold is not satisfied, the method performs step 300 again.

In step 302, in response to the determination of step 300 that the checkpoint threshold is satisfied, a checkpoint zone that includes a set of data slices is identified. In one or more embodiments of the invention, the checkpoint zone includes a multiple of data slices. The data slices may include data and parity chunks stored across the persistent storage devices in the data cluster.

The data processor may then generate checkpoint metadata. The checkpoint metadata may include checkpoint zone information associated with the newly identified checkpoint zone. The checkpoint zone information may include, for example, persistent storage identifiers associated with the checkpoint zone, data slice identifiers for data slices included in the checkpoint zone, chunk identifiers of data and parity chunks within the checkpoint zone, and chunk storage locations, as discussed above. The checkpoint zone information may include other and/or additional information regarding the identified checkpoint zone without departing from the invention.

In step 304, a subset of data and parity chunks within the checkpoint zone is selected. In one or more embodiments of the invention, the subset of data and parity chunks within the checkpoint zone may be selected in a rotating fashion (e.g., see FIG. 4C). For example, a checkpoint zone may include three data slices stored across three persistent storage devices, wherein each data slice includes two data chunks and one parity chunk. The data processor may select two data chunks from the first data slice in the checkpoint zone stored on the first and second persistent storage devices respectively, a parity chunk and data chunk from the second data slice in the checkpoint zone stored in the second and third persistent storage devices respectively, and a parity chunk and data chunk from the third data slice of the checkpoint zone stored in the first and third persistent storage devices respectively.

The subset of data and parity chunks within the checkpoint zone may be selected via other and/or additional methods without departing from the invention. The subset of data and parity chunks within the checkpoint zone may include a sufficient number of data and parity chunks to rebuild or replace at least one data or parity chunk associated with each persistent storage device in the checkpoint zone without requiring additional data and/or parity chunks.

After selecting the subset of data and parity chunks within the checkpoint zone, the data processor may update the checkpoint metadata associated with the checkpoint zone to include data and parity chunk information regarding the selected subset of data and parity chunks. The selected subset of data and parity chunk information may include, for example, chunk identifiers and storage locations as discussed above. The selected subset of data and parity chunks may include other and/or additional information regarding the selected subset of data and parity chunks without departing from the invention.

In step 306, the writing of copies of the selected data and parity chunks to a spare persistent storage device to create a checkpoint is initiated. The data processor may send a request to each persistent storage device associated with the checkpoint zone to copy and send the selected data and parity chunk copies to the spare persistent storage device. In response to the request, the persistent storage devices may each copy and send their selected data and/or parity chunks to the spare persistent storage device. Upon receiving the selected data and parity chunk copies from the persistent storage devices, the spare persistent storage device may store the selected data and parity chunk copies in persistent storage and associate the selected data and parity chunk copies with each other to create a checkpoint.

After creating a checkpoint, the spare persistent storage device may send confirmation to the data processor. The confirmation may include checkpoint information. The checkpoint information may include a checkpoint identifier, chunk identifiers, and/or chunk storage locations within the spare persistent storage device as discussed above. The data processor may update the checkpoint metadata to include the checkpoint information.

In step 308, a determination is made as to whether a persistent storage device has failed or will potentially fail. In one or more embodiments of the invention, the data processor may receive a notification from a health monitor of a persistent storage device indicating that the persistent storage device may potentially fail. In such a scenario, the checkpoint zone operation may be stopped and a proactive copy operation may be performed (see e.g., FIG. 3B). Additionally, the data processor may attempt to store data on a persistent storage device and may receive an error that the persistent storage device has failed. If a persistent storage device has failed or will potentially fail, the method ends following step 308. If a persistent storage device has not failed and will not potentially fail, the method may proceed to step 300.

The method may end following step 308.

FIG. 3B shows a flowchart for performing a proactive copy operation in accordance with one or more embodiments of the invention. The method shown in FIG. 3B may be performed by, for example, a data processor (120, FIG. 1B). Other components of the system illustrated in FIG. 1B may perform the method of FIG. 3B without departing from the invention. While the various steps in the flowchart are presented and described sequentially, one or ordinary skill in the relevant art will appreciate that some or all of the steps may be executed in different orders, may be combined or omitted, and some or all steps may be executed in parallel.

Continuing with the discussion of FIG. 3B, in step 310, a determination is made as to whether a persistent storage device may potentially fail. As discussed above in FIG. 3A, the data processor may receive a notification or an alert from a health monitor that indicates a persistent storage device may potentially fail. If there is a potential persistent storage device failure, the method proceeds to step 312. If there is not a potential persistent storage device failure, the method proceeds to step 318.

Continuing with the discussion of FIG. 3B, in step 312, the writing of copies of the chunks not associated with a checkpoint in the potentially failing persistent storage device to the spare persistent storage device is initiated. In one or more embodiments of the invention, the data processor sends a request to the persistent storage device from which to potential failure notification originated to copy and send all data and/or parity chunk copies not associated with a checkpoint to the spare persistent storage device. The request may include chunk identifiers specifying which data and/or parity chunks to copy and send to the spare persistent storage device. The data processor may compare slice metadata and checkpoint metadata to determine which chunks to include in the request. The data processor may then generate proactive copy metadata, wherein information regarding the chunks associated with the proactive copy operation is included.

Upon receiving the request to copy and send data and/or parity chunks not associated with previous checkpoint zones, the potentially failing persistent storage device may copy the specified chunks and send the copies to the spare persistent storage device. After receiving the chunks from the potentially failing persistent storage device, the spare persistent storage device may store the chunks in persistent storage.

The spare persistent storage device may then send confirmation to the data processor. The confirmation may include information regarding the newly stored chunks. The newly stored chunk information may include, for example, chunk identifiers and chunk storage locations. The newly stored chunk information may include other and/or additional information regarding the newly stored chunks without departing from the invention. The data processor may then update the proactive copy metadata with the information included in the confirmation.

In step 314, a determination is made as to whether the potentially failing persistent storage device failed. The data processor may attempt to store or access data within the potentially failing persistent storage device and the persistent storage device may be unavailable due to failure or the data processor may receive an error from a health monitor indicating that the persistent storage device failed. If the potentially failing persistent storage device failed, the method may end following step 314. If the potentially failing persistent storage device has not failed, the method proceeds to step 316.

In step 316, a determination is made as to whether the copying of the chunks not associated with a checkpoint in the potentially failing persistent storage device to the spare persistent storage device is complete. If the copying of the chunks not associated with a checkpoint in the potentially failing persistent storage device to the spare persistent storage device is complete, the method may proceed to step 318. If the copying of the chunks not associated with a checkpoint in the potentially failing persistent storage device to the spare persistent storage device is not complete, the method proceeds to step 314.

Continuing with the discussion of FIG. 3B, in step 318, as a response to the determination in step 316 that the copying of chunks from the potentially failing persistent storage device not associated with a checkpoint to the spare persistent storage device is complete or the determination in step 310 that no persistent storage device is potentially failing, the checkpoint zone operation is resumed. There may be no potentially failing persistent storage devices or all the chunks stored in the potentially failing persistent storage device may be already copied and stored in the spare persistent storage device. As a result, the proactive copy operation may not be required (or may no longer be required) and the data processor may revert back to performing a checkpoint zone operation. For additional details regarding the checkpoint zone operation, refer to FIG. 3A.

The method may end following step 318.

FIG. 3C shows a flowchart for performing a rebuild of a failed persistent storage device in accordance with one or more embodiments of the invention. The method shown in FIG. 3C may be performed by, for example, a data processor (120, FIG. 1B). Other components of the system illustrated in FIG. 1B may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Continuing with the discussion of FIG. 3C, in step 320, rebuilding chunks are identified using slice metadata, checkpoint metadata, and, optionally (if a proactive copy operation was performed) proactive copy metadata. The data processor may use the slice metadata to identify all of the data and parity chunks stored in the failed persistent storage device. The data processor may use the checkpoint metadata and, if the data processor received a potential persistent storage device notification and performed a proactive copy metadata, the proactive copy metadata to identify all of the chunks associated with the failed persistent storage device that are already stored in the spare persistent storage device. The data processor may compare all the data chunks stored on the failed persistent storage device with the chunks associated with the failed persistent storage device already stored in the spare persistent storage device to identify the rebuilding chunks. The rebuilding chunks may refer to data and/or parity chunks that need to be rebuilt to complete the rebuilding of the failed persistent storage device.

In step 322, the rebuilding of rebuilding chunks is initiated. The data processor may send a request to the spare persistent storage device to rebuild the rebuilding chunks locally. The request may include which chunks to use to rebuild the rebuilding chunks and the algorithm to use to rebuild the building chunks.

In one embodiment of the invention, the spare persistent storage device may not be able to rebuild the rebuilding chunks using only the data and/or parity chunks already stored in the spare persistent storage device as a result of the checkpoint zone operation and/or the proactive copy operations. As a result, the rebuilding chunks may require data and/or parity chunks not stored on the spare persistent storage device. The data processor may use slice metadata to identify the persistent storage devices in which the data and/or parity chunks required to rebuild the rebuilding chunks are stored. The data processor may then send requests to the persistent storage devices to copy and send the chunks required to rebuild the rebuilding chunks to the spare persistent storage device. The data processor may then send a request to the spare persistent storage device to rebuild the rebuilding chunks. After completing the rebuild of the rebuilding chunks, the spare persistent storage device may delete the chunks that are not associated with the failed persistent storage device.

The method may end following step 322.

Example

Figure 4A:
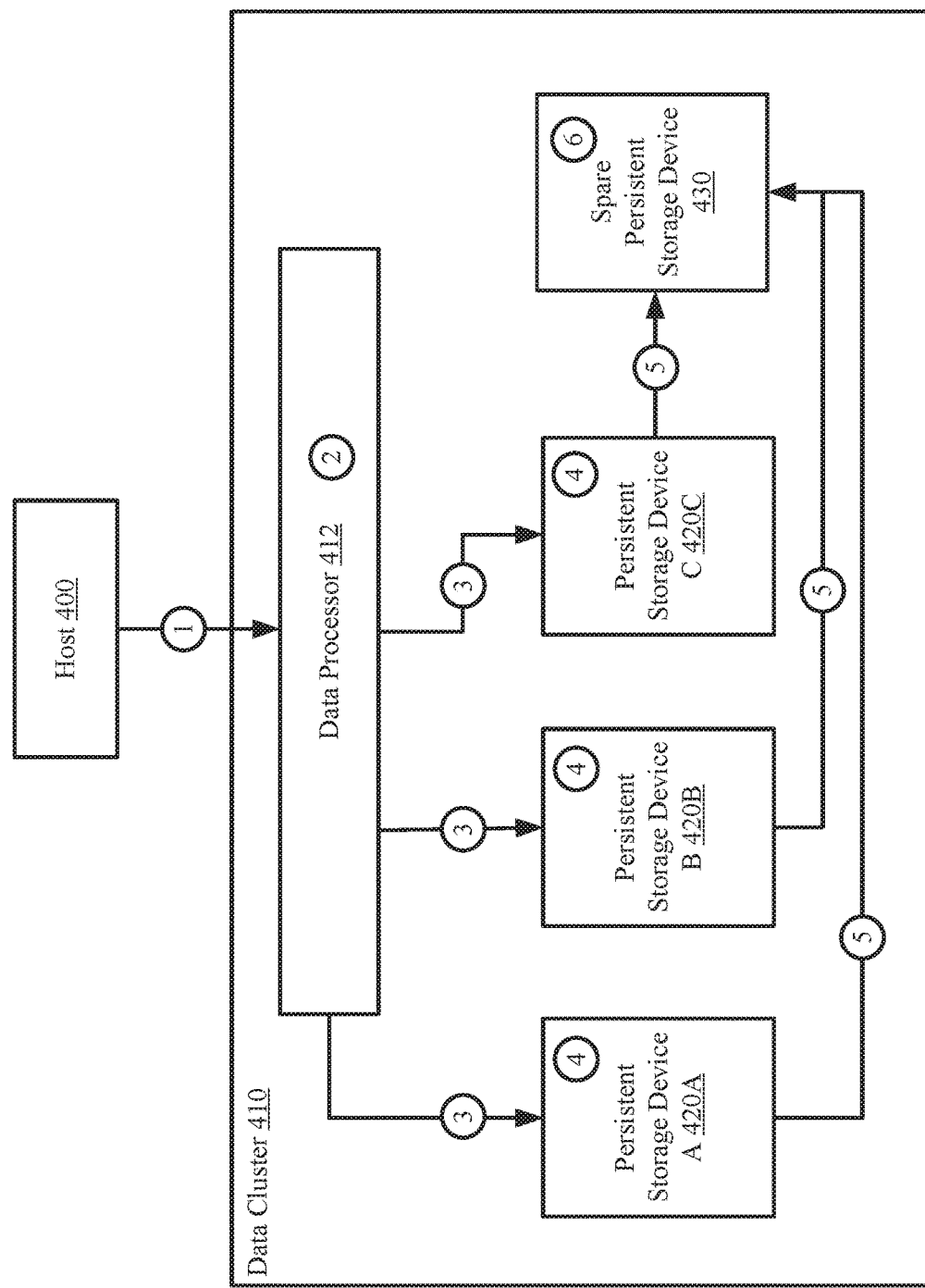
FIGS. 4A-4D show an example in accordance with one or more embodiments of the invention.

The following section describes an example. The example is not intended to limit the invention. The example is illustrated in FIGS. 4A-4D. Turning to the example, consider a scenario in which a data cluster obtains data from a host. The data is a file. The host requests the file to be stored in the data cluster using a 2:1 erasure coding procedure. FIG. 4A shows a diagram of a system in accordance with one or more embodiments of the invention. The host (400) sends the request to a data processor (412) of a data cluster (410) [1]. The data processor (412) performs an erasure coding on the file, breaking the file into data and parity chunks (not shown) [2]. The data processor then sends the chunks to each of the persistent storage devices (420A, 420B, 420C) in which they are stored [3]. The chunks are stored in data slices (not shown), wherein each slice includes two data chunks and one parity chunk. Each chunk in the data slice is stored in a separate persistent storage device (420A, 420B, 420C). For additional details regarding how the chunks are stored in the example system, refer to FIG. 4C.

The data processor (412) then performs a checkpoint zone operation (the method depicted in FIG. 3A). Specifically, the data processor (412) identifies a checkpoint zone that includes a multiple of data slices stored across the persistent storage devices (420A, 420B, 420C) [4]. The data processor (412) then selects a subset of data and parity chunks included in the checkpoint zone and requests the persistent storage devices (420A, 420B, 420C) to copy and send the selected data and parity chunks to the spare persistent storage device (430). Upon receiving the requests, the persistent storage devices (420A, 420B, 420C) copy and send the selected data and/or parity chunks to the spare persistent storage device (430) [5]. The spare persistent storage device generates a checkpoint by storing the obtained chunks [6]. For additional information regarding the checkpoint zone, selected subset of data and parity chunks, and the checkpoint, refer to FIG. 4C.

Figure 4B:
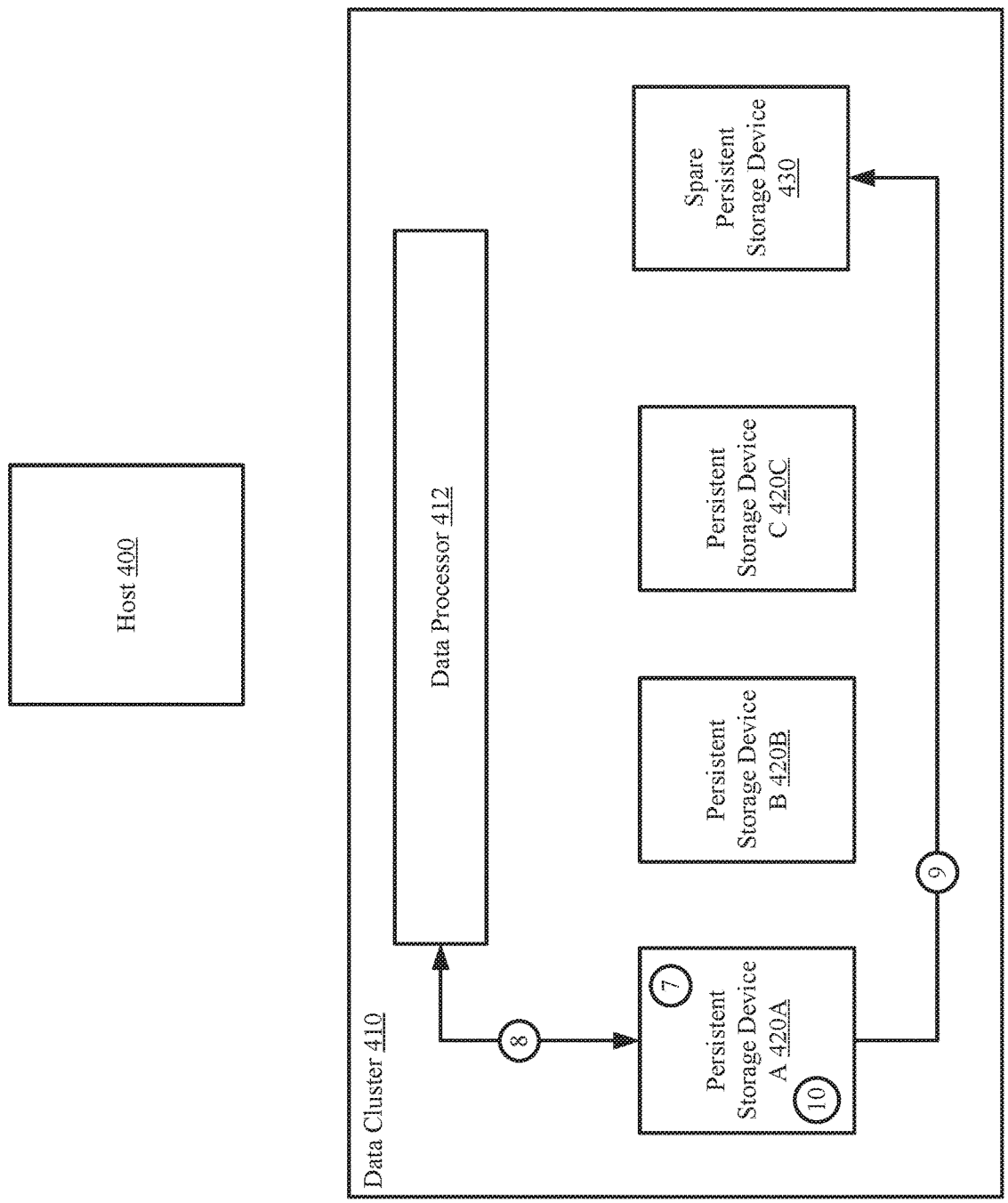

FIG. 4B shows a second diagram of the example system. Continuing with the example, the health manager (not shown) of persistent storage device A (420A) detects a potential persistent storage failure within persistent storage device A (420A) [7]. Persistent storage device A (420A) then notifies the data processor (412) of a potential failure, and, in response, the data processor (412) sends a request initiating a proactive copy operation (the method depicted in FIG. 3B) [8]. The request includes the data and/or parity chunks to be copied and sent to the spare persistent storage device. After receiving the request, persistent storage device A (420A) begins copying and sending the specified chunks to the spare persistent storage device [9]. Before persistent storage device A (420A) completes copying and sending chunks to the spare persistent storage device, persistent storage device A (420A) fails [10].

Figure 4C:
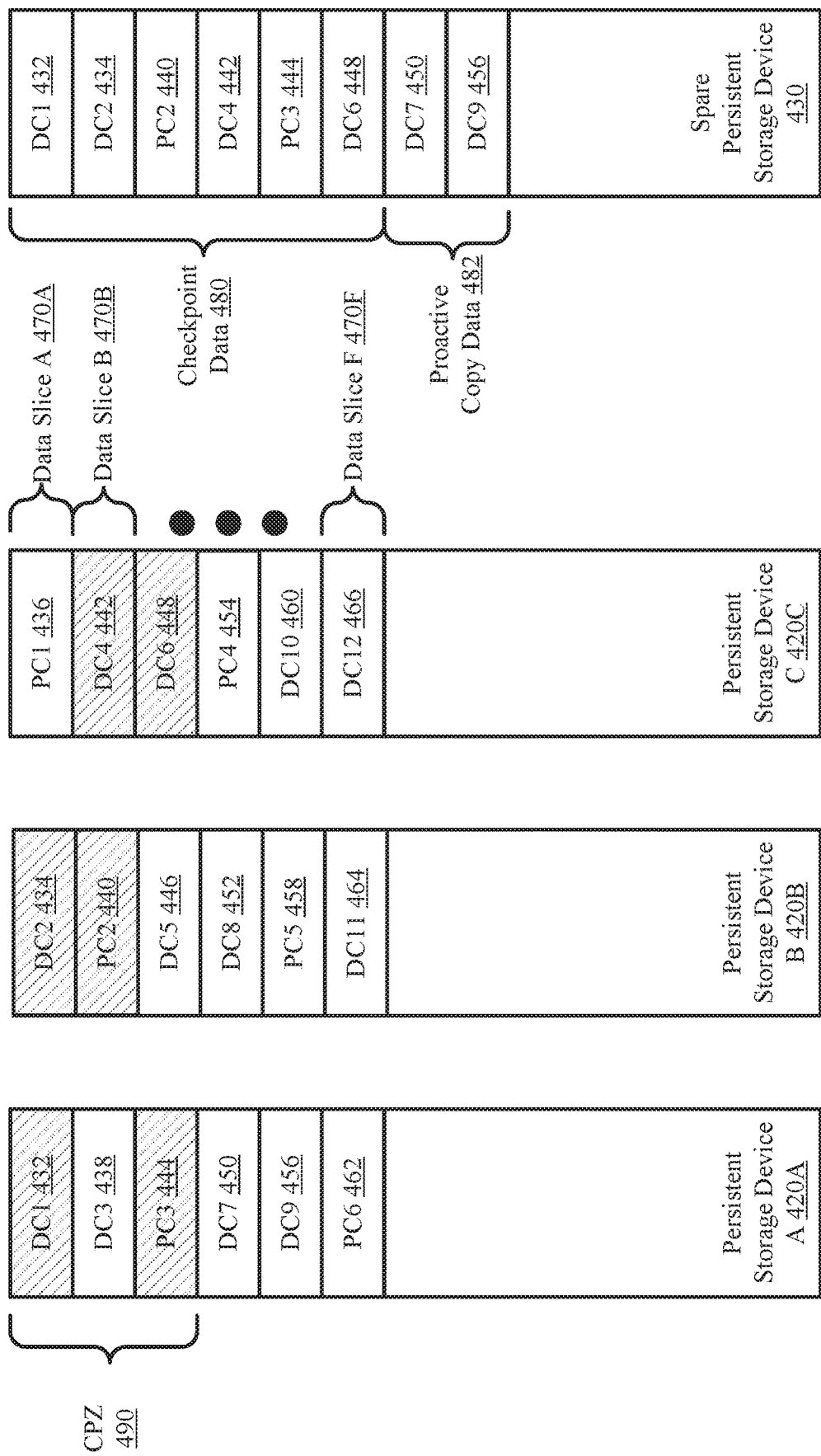

FIG. 4C shows a third diagram of the example system at the instant persistent storage device A (420A) fails and the example proactive copy operation ends. FIG. 4C provides an overview of all the data stored in the data cluster at that instant. Each persistent storage device (420A, 420B, 420C) includes data and parity chunks. Specifically, persistent storage device A (420A) includes DC1 (data chunk one, (432)), DC3 (438), PC3 (parity chunk three, (444)), DC7 (450), DC9 (456), and PC6 (462). Persistent storage device B (420B) includes DC2 (434), PC2 (440), DC5 (446), DC8 (452), PC5 (458), and DC11 (464). Persistent storage device C (420C) includes PC1 (436), DC4 (442), DC6 (448), PC4 (454), DC10 (460), and DC12 (466).

Additionally, each persistent storage device (420A, 420B, 420C) includes a data or parity chunk of each data slice (e.g., 470A, 470B, 470F). For example, data slice A (470A) includes DC1 (432), DC2 (434), and PC1 (436). DC1 (432) is stored in persistent storage device A (420A), DC2 (434) is stored in persistent storage device B (420B), and PC1 (436) is stored in persistent storage device C (420C). Data slice B (470B) includes DC3 (438), PC2 (440), and DC4 (442). DC3 (438) is stored in persistent storage device A (420A), PC2 (440) is stored in persistent storage device B (420B), and DC4 (442) is stored in persistent storage device C (420C). Similarly, each data slice up to and including data slice F (470F) is stored in this configuration as shown in FIG. 4C.

During the example checkpoint zone operation (which was performed at some point in time before the instant depicted in FIG. 4C) depicted in FIG. 4A, a CPZ (checkpoint zone) (490) was identified. The CPZ includes three of the six data slices stored across the persistent storage devices. The data processor then selected a subset of chunks (depicted with the cross-hatching pattern) included in the CPZ in a rotating fashion. The subset of chunks include DC1 (432) and DC2 (434) from data slice A (470A), PC2 (440) and DC4 (442) from data slice B (470B), and PC3 (444) and DC6 (448) from data slice C (not shown). As discussed above, the data processor sends requests to the persistent storage devices (420A, 420B, 420C) to copy and send the selected subset of chunks within the identified CPZ (490) to the spare persistent storage device (430). Checkpoint data (480) includes the copies of the selected subset of chunks within the CPZ obtained from the persistent storage devices (420A, 420B, 420C) that are stored in the spare persistent storage device (430) within a checkpoint. The checkpoint data (480) includes all of the data and parity chunks copied and stored in the spare persistent storage device (430) prior to receiving the potential persistent storage device failure from persistent storage device A (420A) as depicted in FIG. 4B. Upon receiving the potential persistent storage device failure from persistent storage device A (420A), the checkpoint zone operation of FIG. 4A was ended and the proactive copy operation of FIG. 4B was initiated.

Further, as discussed above in FIG. 4B, the data processor received a notification from persistent storage device A (420A) indicating a potential failure. As a result, a proactive copy operation was initiated by the data processor due to receiving the potential persistent storage device notification from persistent storage device A (420A). Proactive copy data (482) includes chunks that were proactively copied from persistent storage device A (420A) (which was experiencing a potential failure during that time) and then sent to and stored in the spare persistent storage device (430) during the example proactive copy operation of FIG. 4B. The example proactive copy operation depicted in FIG. 4B was performed at some point in time after the checkpoint zone operation depicted in FIG. 4A, but prior to the instant in time depicted in FIG. 4C. The proactive copy data (482) includes DC7 (450) and DC9 (456) from persistent storage device A (420A). Before PC6 (462) and DC3 (438) could be proactively copied and sent to the spare persistent storage device (430) during the example proactive copy operation, persistent storage device A (420A) failed. Therefore, PC6 (462) and DC3 (438) were not able to be proactively copied and sent to the spare persistent storage device (430) and must be rebuilt.

Figure 4D:
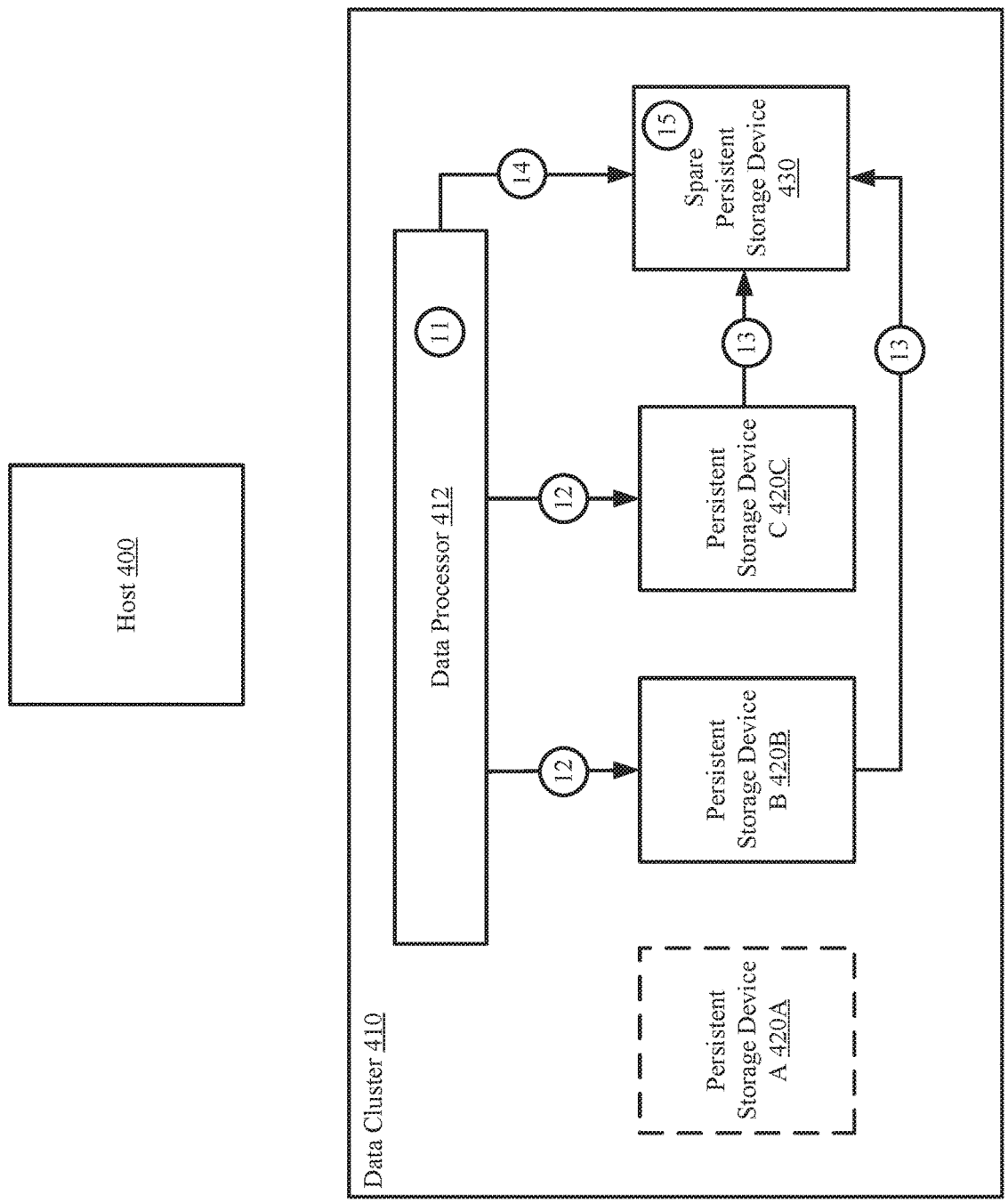

FIG. 4D shows a fourth diagram of the example system. Continuing with the example, after persistent storage A (420A) fails (depicted with a dashed line outline), the data processor (412) identifies the rebuilding chunks required to complete the rebuild of persistent storage device A (420A) [11]. In this example, DC3 (438, FIG. 4C) and PC6 (462, FIG. 4C) need to be rebuilt and are identified as the rebuilding chunks as all other chunks originally stored in persistent storage device A (420A) were already copied and stored in the spare persistent storage device (430) via the checkpoint zone operation and the proactive copy operation.

In order to rebuild PC6 (462, FIG. 4C), the spare persistent storage device (430) needs the other chunks included in the data slice from which PC6 (462, FIG. 4C) is associated. In this case, the data processor (412) sends a request to persistent storage device B (420B) and persistent storage device C (420C) to copy and send DC11 (464, FIG. 4C) and DC12 (466, FIG. 4C) of data slice F (470F) to the spare persistent storage device (430) [12]. In response to the requests, persistent storage device B (420B) and persistent storage device C (420C) copy and send DC11 (464, FIG. 4C) and DC12 (466, FIG. 4C) to the spare persistent storage device (430) respectively [13].

The spare persistent storage device (430) already includes the other chunks (PC2 (440, FIG. 4C) and DC4 (442, FIG. 4C)) from data slice B (470B, FIG. 4C) required to rebuild DC3 (438, FIG. 4C) as a result of the earlier checkpoint zone operation depicted in FIG. 4A. The data processor (412) sends a request to the spare persistent storage device (430) to rebuild the rebuilding chunks [14]. In response to the request, the spare persistent storage device (430) rebuilds the rebuilding chunks and deletes all of the chunks not associated with persistent storage device A (420A) [15].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of storing data and the efficiency of rebuilding data in a data cluster. In one embodiment of the invention, the reliability and efficiency is improved by performing checkpoint zone operations in a manner that copies and sends a subset of data stored in persistent storage devices to a spare persistent storage device of a data cluster in the background of data storage operations with minimal impact on the performance of the data storage operations of the data cluster. The checkpoint zone operations enable a spare persistent storage device to obtain data from persistent storage devices in a data cluster before a persistent storage device fails. Upon a persistent storage device failure, the spare persistent storage device uses the previously obtained data to rebuild and/or replace, at least a portion of, the data stored within the failed persistent storage device.

In other embodiments of the invention, the reliability and efficiency is improved by performing proactive copy operations along with the checkpoint zone operations in a manner that copies and sends data of a potentially failing persistent storage device to a spare persistent storage device of a data cluster in the background of data storage operations with minimal impact on the performance of the data storage operations of the data cluster. More specifically, one or more persistent storage devices may include a health monitor. In these scenarios, the health monitor includes functionality to detect when persistent storage (or a portion thereof) in a persistent storage device may fail. In the event of a potential persistent storage device failure is detected, the checkpoint zone operation is stopped and a proactive copy operation is performed. The proactive copy operation enables a spare persistent storage device to obtain data from a potentially failing persistent storage device before the potentially failing persistent storage device fails. Upon failure of the potentially failing persistent storage device, the spare persistent storage device uses the previously obtained data to rebuild or replace, at least a portion of, the failed persistent storage device.

In traditional data clusters, after a persistent storage device failure, the spare persistent storage device obtains associated data from healthy persistent storage devices in the data cluster and must use the obtained data to rebuild the entirety of the data that was stored on the failed persistent storage device. Embodiments of the invention improve the traditional data clusters by preemptively copying data from persistent storage devices (or a potentially failing persistent storage device) to a spare persistent storage device prior to a persistent storage device failure via checkpoint zone operations and/or proactive copy operations. As a result, the latency and computational efficiency required to rebuild a failed persistent storage device on a spare persistent storage device in a data cluster are improved.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   detecting a persistent storage device failure in a persistent storage device of a plurality of persistent storage devices; and
   in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device,
wherein prior to detecting the persistent storage device failure:
identifying a checkpoint zone, wherein the checkpoint zone comprises chunks stored across the plurality of persistent storage devices;
selecting a subset of the chunks, wherein the checkpoint metadata is based on the selected subset of the chunks; and
initiating writing of copies of the subset of the chunks to the spare persistent storage device.

2. The method of claim 1, wherein the subset of the chunks comprises at least one data chunk and at least one parity chunk.

3. The method of claim 1, wherein the subset of the chunks comprises at least one chunk from each of the plurality of persistent storage devices.

4. The method of claim 1,
wherein the checkpoint zone comprises a plurality of slices,
wherein each of the chunks is associated with one of the plurality of slices; and
wherein a cardinality of the plurality of slices is based on a checkpoint threshold.

5. The method of claim 4, wherein at least one chunk associated with each of the plurality of slices is a parity chunk.

6. The method of claim 5, wherein the slice metadata specifies which of the chunks are associated with each of the plurality of slices.

7. A system, comprising:
a processor;
a data processor, which when executed by the processor performs a method,
the method comprising:
detecting a persistent storage device failure in a persistent storage device of a plurality of persistent storage devices; and
in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device,
wherein prior to detecting the persistent storage device failure:
identifying a checkpoint zone, wherein the checkpoint zone comprises chunks stored across the plurality of persistent storage devices;
selecting a subset of the chunks, wherein the checkpoint metadata is based on the selected subset of the chunks; and
initiating writing of copies of the subset of the chunks to the spare persistent storage device.

8. The system of claim 7, wherein the subset of the chunks comprises at least one data chunk and at least one parity chunk.

9. The system of claim 7, wherein the subset of the chunks comprises at least one chunk from each of the plurality of persistent storage devices.

10. The system of claim 7,
wherein the checkpoint zone comprises a plurality of slices,
wherein each of the chunks is associated with one of the plurality of slices; and
wherein a cardinality of the plurality of slices is based on a checkpoint threshold.

11. The system of claim 10, wherein at least one chunk associated with each of the plurality of slices is a parity chunk.

12. The system of claim 11, wherein the slice metadata specifies which of the chunks are associated with each of the plurality of slices.

13. A non-transitory computer readable medium comprising computer readable program code, which when executed by a computer processor enables the computer processor to perform a method, the method comprising:
detecting a persistent storage device failure in a persistent storage device of a plurality of persistent storage devices; and
in response to the detecting, initiating a rebuilding of data in a spare persistent storage device using checkpoint metadata and slice metadata, wherein the data is a copy of data that was stored in the persistent storage device and wherein the spare persistent storage device is not one of the plurality of persistent storage device,
wherein prior to detecting the persistent storage device failure:
identifying a checkpoint zone, wherein the checkpoint zone comprises chunks stored across the plurality of persistent storage devices;
selecting a subset of the chunks, wherein the checkpoint metadata is based on the selected subset of the chunks; and
initiating writing of copies of the subset of the chunks to the spare persistent storage device.

14. The non-transitory computer readable medium of claim 13, wherein the subset of the chunks comprises at least one data chunk and at least one parity chunk.

15. The non-transitory computer readable medium of claim 13, wherein the subset of the chunks comprises at least one chunk from each of the plurality of persistent storage devices.

16. The non-transitory computer readable medium of claim 13,
wherein the checkpoint zone comprises a plurality of slices,
wherein each of the chunks is associated with one of the plurality of slices; and
wherein a cardinality of the plurality of slices is based on a checkpoint threshold.

17. The non-transitory computer readable medium of claim 16, wherein at least one chunk associated with each of the plurality of slices is a parity chunk.

* * * * *